Jan. 2, 1962  A. M. STOTT  3,015,312
SELECTIVE MULTICYCLE ACTUATOR
Filed Oct. 26, 1959
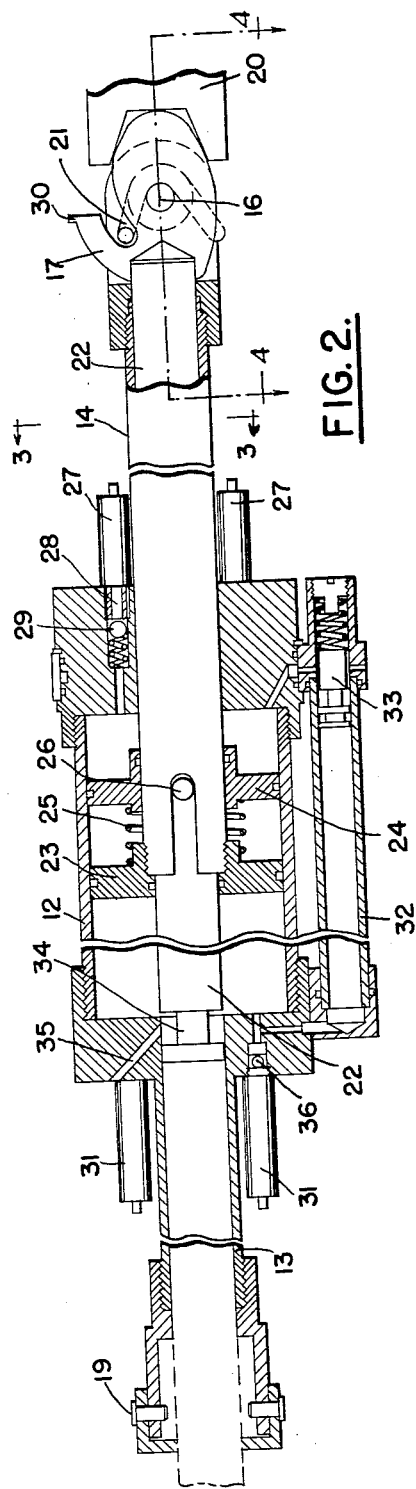
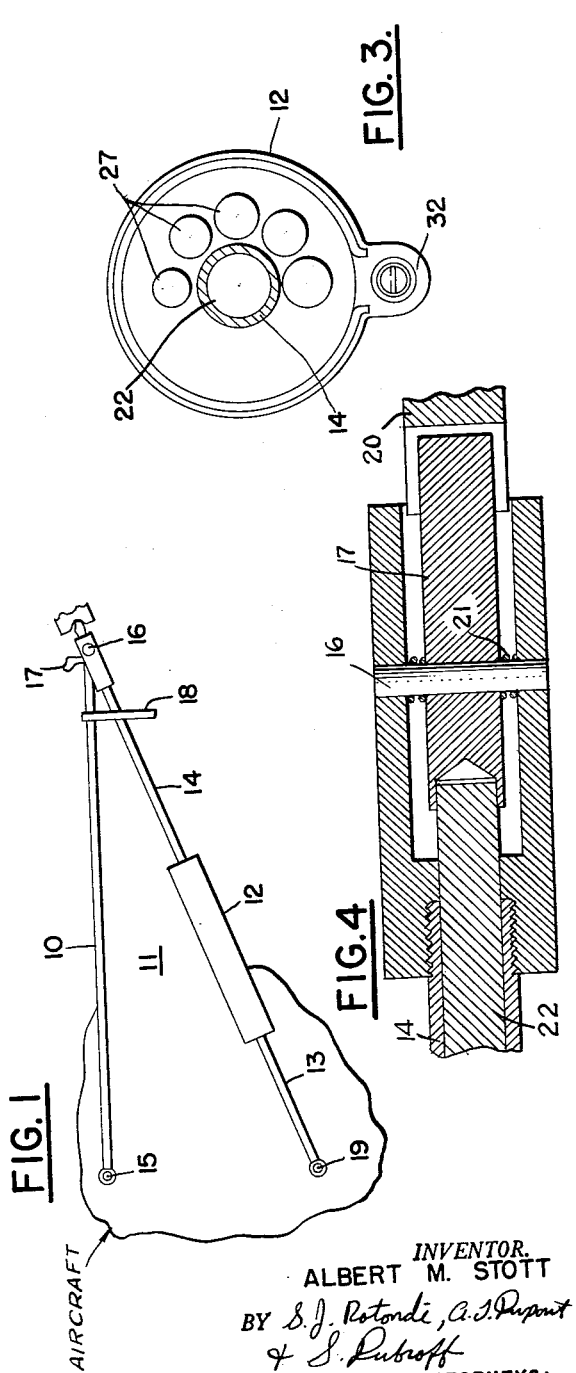
INVENTOR.
ALBERT M. STOTT
BY S. J. Rotondi, A. J. Dupont
& S. Dubroff
ATTORNEYS:

3,015,312
SELECTIVE MULTICYCLE ACTUATOR
Albert M. Stott, Aldan Clifton Heights, Pa., assignor to the United States of America as represented by the Secretary of the Army
Filed Oct. 26, 1959, Ser. No. 848,876
6 Claims. (Cl. 121—40)
(Granted under Title 35, U.S. Code (1952) sec. 266)

The invention described herein may be manufactured and used by or for the Government for governmental purposes without the payment to me of any royalty thereon.

This invention relates to selective multi-cycle actuating devices such as are adapted to extend and retract a weapon or other load device repeatedly during the flight of an aircraft.

It has been proposed to operate such actuating devices from the same hydraulic system that powers the bomb bay doors and other elements of the aircraft. This involves a main launcher or load support arm which is powered by a double-acting, strut-type hydraulic actuator and a separate hydraulically actuated uplock for locking the load support beam inside the aircraft. It is found that this structure overtaxes the hydraulic system of the aircraft and involves an undesirable increase in weight and complexity.

The present invention avoids these difficulties by the provision of an improved actuator which has a weight approximately one-half that of the hydraulic actuator, is powered by a gas pressure, and functions both to extend and retract the weapon and to operate the lock between the load support beam and a fixed keeper or anchor.

Basically, the new actuator consists of a double-acting thruster which is powered by cartridges designed for electrical ignition, although other means such as manual or gas firing may be used. Simplification of the actuator is effected by building the uplock onto the end of the piston rod providing powerful and positive unlocking and automatic sequencing of the locking and unlocking cycle. The exhaust valve for one end of the cylinder operates by means of the same rod that actuates the uplock, and the exhaust valve for the other end of the cylinder operates in a simple by-pass line from the force developed by the applied gas pressure. The weight reduction effected by this actuator is about one-half that of the corresponding hydraulically operated actuator.

The invention will be better understood from the following description when considered in connection with the accompanying drawings and its scope is indicated by the appended claims.

Referring to the drawings:

FIG. 1 illustrates the construction of the actuator.

FIG. 2 is a longitudinal sectional view illustrating various details of the thruster which forms the variable length arm of the actuator, various details of a latch also appearing in this figure.

FIG. 3 is a section taken on the line 3—3 of FIG. 2.

FIG. 4 is a section taken on the line 4—4 of FIG. 2.

As indicated by FIG. 1, the actuator includes a launcher or load support arm 10 and a variable length arm 11 which includes a cylinder 12 having an extension 13 pivoted to a fixed pin 19 and a piston rod 14. The arm 10 is pivoted at one end to a fixed pin 15 and at the other end to a pin 16 which also extends through a latch 17 and the end of the rod 14. The weapon or other load to be moved into and out of the aircraft is supported from the arm 10 by any suitable means such as a U-shaped support 18. The load support 18 is extended from the aircraft upon movement of the rod 14 into the cylinder 12 and is retracted thereinto upon movement of the rod out of the cylinder. How this is accomplished will appear from a consideration of FIGS. 2 and 3.

In the position illustrated by FIG. 2, the latch 17 locks the contiguous ends of the arms 10 and 11 to a fixed keeper or anchor 20. A spring 21 tends to rotate the latch 17 counterclockwise out of the recess in the keeper 20 but is prevented from doing this by a lock control rod 22 which extends through the rod 14 and the cylinder 12. A piston 23 is threaded onto the inner end of the rod 14, a piston 24 is fixed to the lock control rod 22 by pin 26, and a spring 25 functions to space the two pistons apart so long as no pressure is applied to the piston 24.

When pressure is applied to the piston 24, however, the spring 25 is compressed, the rod 22 is moved with respect to the rod 14 and latch 17 and the contiguous ends of the arms 10 and 11 are unlocked from the keeper 20 as previously indicated. Thereafter this pressure is also applied to the piston 23 and the rods 14 and 22 are drawn into the cylinder 12 thereby lowering or extending the load support 18.

This lowering of the load is effected by firing one of the down stroke cartridges 27 thus producing a high pressure gas which may be filtered by a filter 28 and is passed through a check valve 29 into the cylinder 12 where it acts on the piston 24 to unlock the latch 17 and move the rods 14 and 22 into the cylinder 12 as previously indicated. The first part of the downward movement forcibly cams the latch to rotate out of the keeper 20. Once out of the keeper the latch is held against a stop 30 by the spring 21. Downward circular motion of the load continues until the fully extended position is reached. In this position the gas pressure acting on the piston holds the load support arm at the limit of its travel.

Raising of the load support arm 10 is effected by firing of one of the upstroke cartridges 31. This generates a gas pressure which (1) is applied through a check valve 36 and a bypass 32 to operate a valve 33 which exhausts the gas on the down stroke side of the piston 24, and (2) applies to the piston 23 a pressure by which the rods 14 and 22 are moved out of the cylinder 12. As the rod 10 nears the end of its upward travel, the latch 17 hits the keeper 20 and cams into position against the pressure of the spring 21. While the latch is thus rotated, the piston spring 25 is being compressed. When the end of the travel is reached, the lock control rod 22 re-engages the latch. In this position, the circumferential groove 34 near the end of the rod registers with a passageway 35 in the cylinder 12 and the operating gas is allowed to escape from the cylinder. This completes the cycle of operation which may be repeated by successively firing the down and up stroke cartridges 27 and 31.

In connection with the operation of the exhaust valve 33, it is to be understood that the volume of the upstroke end of the cylinder 12 is made sufficiently large to prevent the build-up of a pressure which could open the valve 33 during the down-stroke of the pistons. Otherwise this valve would release the hold-down pressure prematurely.

As applied to the extension of weapons from an aircraft and their retraction thereunto, the present invention meets the requirement that the actuator be capable of extending and retracting the weapon repeatedly. This requirement is based on the theory that target decisions might change three or four times before the weapon is fired. It is estimated that a firing decision will be made within ten seconds. The design of the actuator is such that the operating gas will hold the weapon at the lower end of its travel for a much longer time. The fact that weapon is in the aircraft between target decisions obviously has the advantage that drag is minimized.

I claim:
1. In an actuator, the combination of a cylinder, first and second pistons movable in said cylinder, a keeper, a tubular member fixed at one end to said first piston, a latch pivoted to the other end of said member and arranged to lock said member to said keeper, a latch operating rod extensible through said member and said cylinder and movable with said second piston for controlling said latch, means biasing said pistons to a spaced relationship, means for applying a first pressure whereby said second piston and said rod are moved to unlock said latch and said rod and said member are thereafter moved into said cylinder, and means arranged to apply to the first of said pistons a second pressure whereby said first pressure is relieved and said rod and said member are moved into locking engagement with said keeper.

2. In an actuator, the combination of a cylinder, first and second pistons movable in said cylinder, a keeper, a tubular member fixed at one end to said first piston, a latch pivoted to the other end of said member and arranged to lock said member to said keeper, a latch operating rod extensible through said member and said cylinder and movable with said second piston for controlling said latch, means biasing said pistons to a spaced relationship, means for applying a first pressure whereby said second piston and said rod are moved to unlock said latch and said rod and said member are thereafter moved into said cylinder, means arranged to apply to the first of said pistons a second pressure whereby said first pressure is relieved and said rod and said member are moved into locking engagement with said keeper, said cylinder and said rod being formed to relieve said second pressure upon the completion of said locking movement.

3. A combination according to claim 1 wherein means are provided for repeating the application of said pressures.

4. A combination according to claim 1 wherein the means for relieving said first pressure is a stop valve operable in response to the application of said second pressure.

5. A combination according to claim 1 wherein said latch is biased to its open position and is arranged to be cammed into its closed position by movement of said member.

6. A combination according to claim 1 wherein a load support member is pivoted at one end to a fixed support and at the other end to said latch and tubular member and wherein said cylinder has an extension pivoted to a fixed support whereby the loaded end of said support member is rotated about its fixed pivotal support as said rod and said tubular member are moved in said cylinder.

No references cited.